United States Patent
Chan et al.

(10) Patent No.: US 12,399,612 B2
(45) Date of Patent: *Aug. 26, 2025

(54) METHOD AND APPARATUS FOR INTERACTING WITH CONTENT THROUGH OVERLAYS ON A MOBILE DEVICE

(71) Applicant: Alibaba Group Holding Limited, Grand Cayman (KY)

(72) Inventors: Stephanie Suk Hing Chan, Santa Clara, CA (US); Johnny Key Jye Chen, Santa Clara, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,387

(22) Filed: Sep. 28, 2023

(65) Prior Publication Data

US 2024/0028192 A1    Jan. 25, 2024

Related U.S. Application Data

(63) Continuation of application No. 14/696,166, filed on Apr. 24, 2015, now Pat. No. 11,797,172.

(60) Provisional application No. 62/129,639, filed on Mar. 6, 2015.

(51) Int. Cl.
| | | |
|---|---|---|
| G06F 3/0481 | (2022.01) | |
| G06F 1/16 | (2006.01) | |
| G06F 3/0488 | (2022.01) | |
| G06Q 30/0235 | (2023.01) | |
| G06Q 30/0601 | (2023.01) | |
| G06F 3/04883 | (2022.01) | |

(52) U.S. Cl.
CPC ............ *G06F 3/0488* (2013.01); *G06F 1/163* (2013.01); *G06F 3/0481* (2013.01); *G06Q 30/0235* (2013.01); *G06Q 30/0643* (2013.01); *G06F 3/04883* (2013.01)

(58) Field of Classification Search
CPC ...... G06F 3/0488; G06F 1/163; G06F 3/0481; G06F 3/04883; G06F 3/0482; G06Q 30/0235; G06Q 30/0643
See application file for complete search history.

(56) References Cited

U.S. PATENT DOCUMENTS

| | | |
|---|---|---|
| 9,196,003 B2 | 11/2015 | Argue et al. |
| 9,414,115 B1 | 8/2016 | Mao et al. |
| 9,438,646 B2 | 9/2016 | Andler et al. |
| 9,563,350 B2 | 2/2017 | Kim |
| 9,589,535 B2 | 3/2017 | Poon et al. |

(Continued)

*Primary Examiner* — Temesghen Ghebretinsae
*Assistant Examiner* — K. Kiyabu

(57) ABSTRACT

A method for sharing an image with one or more overlays on a mobile platform includes the steps of receiving an image; adding an overlay to the receive image, the overlay being a generated content conveying an impression when viewing the received image; recognizing by matching the overlay to a set of templates for identifying a template intended of the overlay; assigning the template which is recognized with the overlay to the received image; superimposing the template onto the received image to create a new image, the new image indicating the conveyed impression; and saving the new image into a file, the file including information regarding a review directed to the content displayed in the received image and correlated to the conveyed impression.

20 Claims, 19 Drawing Sheets

(56) References Cited

U.S. PATENT DOCUMENTS

| | | |
|---|---|---|
| 9,626,697 B2 | 4/2017 | Rathus et al. |
| 9,690,477 B2 | 6/2017 | Li et al. |
| 9,791,962 B2 | 10/2017 | Long |
| 9,805,241 B2 | 10/2017 | Li |
| 9,882,859 B2 | 1/2018 | Kimura et al. |
| 9,954,812 B2 | 4/2018 | Kimura et al. |
| 9,996,255 B2 | 6/2018 | Rav-Noy et al. |
| 10,055,101 B2 | 8/2018 | Namgung et al. |
| 10,089,006 B2 | 10/2018 | Lee et al. |
| 2012/0146911 A1 | 6/2012 | Griffin |
| 2013/0135236 A1* | 5/2013 | Yano ............... G06F 3/0488 345/173 |
| 2013/0204739 A1* | 8/2013 | Friedman ........... G06Q 30/02 705/26.7 |
| 2015/0029110 A1 | 1/2015 | Chang |
| 2015/0324078 A1 | 11/2015 | Dipin |
| 2016/0096706 A1 | 4/2016 | Tang |
| 2016/0110100 A1 | 4/2016 | Wang et al. |
| 2016/0132231 A1 | 5/2016 | Rathod |

\* cited by examiner

EXEMPLARY OVERLAY TEMPLATES

| OVERLAY TEMPLATE | CONTEXT OF A CONTENT | ACTION | UPDATE OPTION |
|---|---|---|---|
| 656 — ♡ | ALIEXPRESS APP | ADD TO WISH LIST | ASSIGN THE TEMPLATE |
| 656 — 🎁 | ALIEXPRESS APP | GIFT WRAP UPON CHECKING OUT | NO |
| 656, 672 — ○ — 670 | ALIEXPRESS INTEGRATED WITH A WATCH FACE | SWITCH CATAGORY COUNTER CLOCK-WISE | NO |
| 656, 670 — ○ — 672 | ALIEXPRESS INTEGRATED WITH A WATCH FACE | SWITCH CATAGORY CLOCK-WISE | NO |
| 656 — ○ | ALIEXPRESS APP | NO | NO |
| 656 — ☺ | ALIEXPRESS APP | NO | ASSIGN THE TEMPLATE |

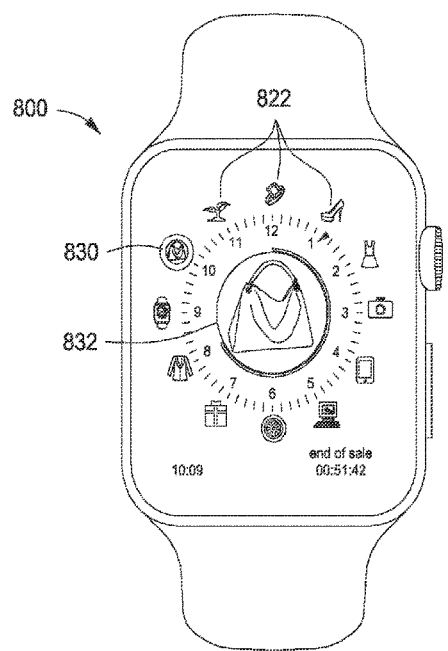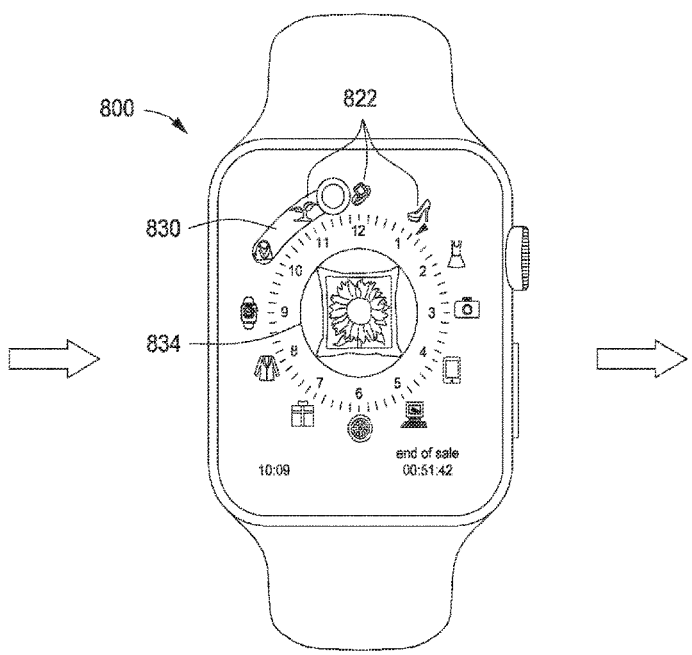
FIG. 8B
FIG. 8C

METHOD AND APPARATUS FOR INTERACTING WITH CONTENT THROUGH OVERLAYS ON A MOBILE DEVICE

CROSS REFERENCE TO RELATED APPLICATION

This application claims the benefits to U.S. Provisional Application No. 62/129,639 filed on Mar. 6, 2015, and is a continuation of U.S. patent application Ser. No. 14/696,166 filed on Apr. 24, 2015, both of which are incorporated herein by reference in their entireties.

TECHNICAL FIELD

The present disclosure relates generally to interacting with content on a mobile device, and more particularly to sharing images with overlays as well as converting overlays into actions on a mobile device.

BACKGROUND

Touchscreens are touch-sensitive electronic visual displays that receive tactile input information entered using a human digit, a special glove, or a stylus. A typical touchscreen can sense touch events including contact or movement on the surface of the screen, such as taps, swipes, pinches, flicks, other gestures, marks, lines, or geometric shapes. In general, touchscreens enable users to interact directly with images displayed on the screen, rather than through an intermediate device, such as a mouse or a touchpad.

Some existing touchscreens implement resistive touch-sensing technology, while other existing touchscreens implement capacitive, surface acoustic wave, infrared or optical technologies to sense touch events. Touchscreens have been used as input devices in tablet computers, mobile phones, and gaming consoles.

A currently emerging area of application is in compact wearable processing devices, such as wrist-wearable devices, in which the touchscreens typically are of relatively small size. The reduced size of touchscreens on wearable devices has drawbacks regarding existing user interface implementations. For example, a user of a compact processing device does not have available a full range of user interface elements such as menu bars, drop down menu items, navigation buttons or the like that are supported and provided on a computing device with a larger footprint of processing power. Consequently, users' experience on compact wearable processing devices lacks ease and efficiency.

Furthermore, images displayed on such compact wearable processing devices are usually non-interactive, thereby only allowing users to view the images, but not to interact or connect with the image content in manners available on non-compact processing devices. For example, a user cannot leave a comment or feedback regarding the image content for the purposes of sharing opinions or impressions among friends, family, groups or communities on a social network.

SUMMARY

According to one exemplary embodiment of the present disclosure, a method for sharing an image with one or more overlays on a mobile platform includes the steps of receiving an image, adding an overlay to the received image such that the overlay is a generated content that conveys an impression of the image upon viewing the received image, recognizing by matching the overlay to a set of templates to identify a template intended by the overlay, assigning the recognized matching template to the received image, superimposing the template onto the received image to create a new image such that the new image indicates the impression conveyed by the overlay, and saving the new image into a file, the file including information regarding a review directed to the content displayed in the received image and correlated to the conveyed impression.

According to another exemplary embodiment of the present disclosure, a non-transitory computer readable storage medium having embedded therein program instructions, when executed by one or more processors of a computer, causes the computer to execute a process for sharing an image with one or more overlays on a mobile platform. The process includes receiving an image, adding an overlay to the received image such that the overlay is a generated content that conveys an impression of the image upon viewing the received image, recognizing by matching the overlay to a set of templates to identify a template intended by the overlay, assigning the recognized matching template to the received image, superimposing the template onto the received image to create a new image such that the new image indicates the impression conveyed by the overlay, and saving the new image into a file, the file including information regarding a review directed to the content displayed in the received image and correlated to the conveyed impression.

According to yet another exemplary embodiment of the present disclosure, a system for sharing reactions towards images on a mobile platform includes a displaying module for the receiving an image, an acquisition module to add overlay content such that the overlay content conveys an impression of the image upon viewing the received image, a reorganization module for recognizing the overlay content by matching to a set of templates to identify a template intended by the overlay content, and for assigning the template in response to the recognized matching, a modification module for superimposing the received image and the assigned overlay into a new image such that the new image indicates the impression conveyed by the overlay.

According to another exemplary embodiment of the present disclosure, a method for converting a user generated overlay into an action on a mobile device includes the steps of receiving a content on a display of the mobile device, the content being associated with a set of actions for selection, generating an overlay image on the received content, the overlay image being generated content which enables an action by the mobile device in response to the received content, matching the overlay image and received content to a set of templates for identifying a template associated with the overlay image and received content, each template of the set of templates being associated with an action, identifying a template matched to the overlay image and received content, and assigning an action associated with the template to the received content.

According to another exemplary embodiment of the present disclosure, a non-transitory computer readable storage medium having embedded therein program instructions, when executed by one or more processors of a computer, causes the computer to execute a process for converting a generated overlay into an action on a mobile device. The process includes the steps of receiving a content on a display of the mobile device, the content being associated with a set of actions for selection, generating an overlay image on the received content, the overlay image being generated content which enables an action by the mobile device in response to the received content, matching the overlay image and received content to a set of templates for identifying a template associated with the overlay image and received content, each template of the set of templates being associated with an action, identifying a template matched to the overlay image and received content, and assigning an action associated with the template to the received content.

According to yet another exemplary embodiment of the present disclosure, a system for converting a generated overlay into an action on a mobile device includes a displaying module for the receiving a content, the content being associated with a set of actions for selection, an acquisition module configured to capture an overlay image on the received content, the overlay image being generated content which enables an action by the mobile device in response to the received content, a recognition module configured to match the overlay image and received content to a set of templates for identifying a template associated with the overlay image and received content, each template of the set of templates being associated with an action, and an overlay action module configured to assign an action associated with the template to the received content.

The details of one or more embodiments of the disclosure are set forth in the accompanying drawings and the description below. Other features, objects, and advantages of the disclosure will be apparent from the description and drawings, and from the claims.

DESCRIPTION OF THE DRAWINGS

FIGS. 6A-6D depict a schematic view of exemplary user interface to personalize an application for content interaction on a mobile device, as well as associated overlay images, overlay templates and actions associated therewith.

FIGS. 8A-8E depict a sequence of another exemplary method of interacting with content by converting user generated overlays into actions on a mobile device in accordance with another embodiment of the present invention.

DETAILED DESCRIPTION

Figure 1:
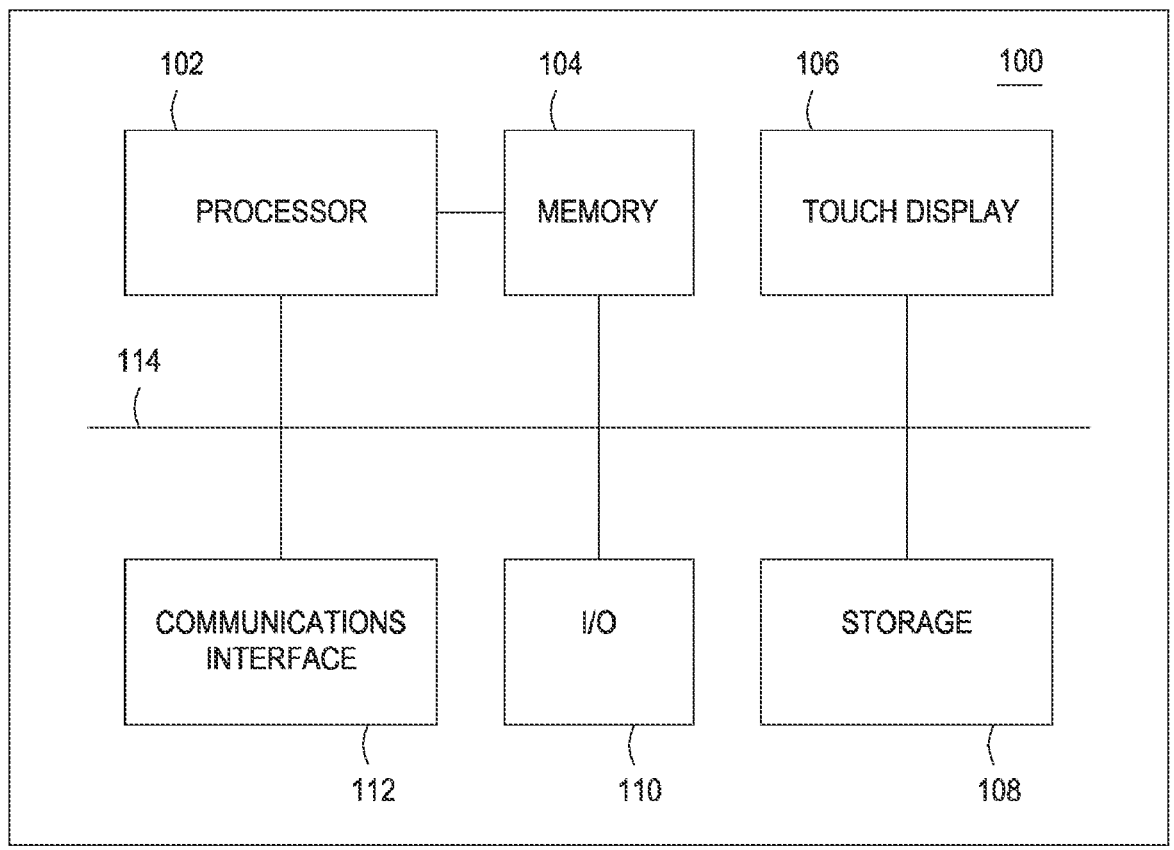
FIG. 1 is a schematic view depicting an exemplary general computing system that can implement an exemplary system and method in accordance with an embodiment of the present invention.

In some exemplary embodiments, a system and method for content interaction through user generated overlays on a mobile device is illustrated. One exemplary system and method is illustrated as sharing images with overlays with a third party on a communication network. A user shopping in an ecommerce marketplace on a mobile platform may like to share impulsive impressions towards product or service items encountered on the ecommerce marketplace with friends, family, groups or communities. For example, with a touch screen of a mobile device executing an ecommerce application, the user can finger draw a graphic heart shape on an image displayed on the touch screen to convey an impression of the content portrayed by the image as "liking" and "wishing to have". Sending the image with a heart shape to friends, family, groups or communities on communication networks accomplishes sharing the aforementioned "liking" and "wishing to have" impression towards the content of the image amongst the intended recipients.

Another exemplary system and method is illustrated for converting an overlay to an action on a mobile device. A user of an application on a mobile device with limited user interface elements may like to interact with the application using contacts or touches with a touch display screen of the mobile device to initiate actions or commands for the application to execute on the mobile device. For example, with a touch screen of a mobile device executing an ecommerce application, the user can again finger draw a graphic heart shape on an image displayed on the touch screen to task the ecommerce application to both add the item portrayed in the image on display to a "wish-to-have" list associated with the user's ecommerce account or user profile data, and to update the image by superimposing a predefined heart shape at the upper left corner of the image to reflect the action performed in response to the user generated heart shaped overlay.

For yet another example, with a touch screen of a compact mobile device executing an ecommerce application in the context of a time display of the compact mobile device, the user can nevertheless finger draw an arc shape or any shape that generally follows the outer perimeter of the shape of the watch dial of the time display from a first position to a second position, passing through a first icon representing a first category of items for purchase and a second icon representing a second category of items for purchase. Upon the user gesturing the arc overlay through a vicinity of the first icon, an image of an item of the first category will be displayed in the center portion of the time display. As the user further gestures past the remote end of the vicinity of the first position and into a vicinity of the second icon, an image of an item from the second category will be displayed at the center portion of the time display, replacing the image of the item from the first category. Consequently, the user initiates categories switching actions by generating an arc shaped overlay over the time display of the compact mobile device.

Now referring to FIG. 1, an exemplary general computing device 100 that can be used to implement a system and method in accordance with an embodiment of the present invention includes a processor 102, a memory 104, a touch display 106, a storage 108, an I/O circuitry 110 and a network communication interface 112. The various components of the computing device 100 are coupled by a local data link 114, which in various embodiments incorporates, for example, an address bus, a data bus, a serial bus, a parallel bus, or any combination of these.

Programming code, such as source code, object code or executable code, stored on a computer-readable medium, such as the storage 108 or a peripheral storage component coupled to the computing device 100, can be loaded into the memory 104 and executed by the processor 102 in order to perform the functions of a system and method in accordance with the present invention. In various embodiments, the computing device 100 can include, for example, a mobile device, such as a personal digital assistant (PDA), a cellular telephone, a smart phone, a wearable device, or the like, with a relatively compact touch display.

Figure 2:
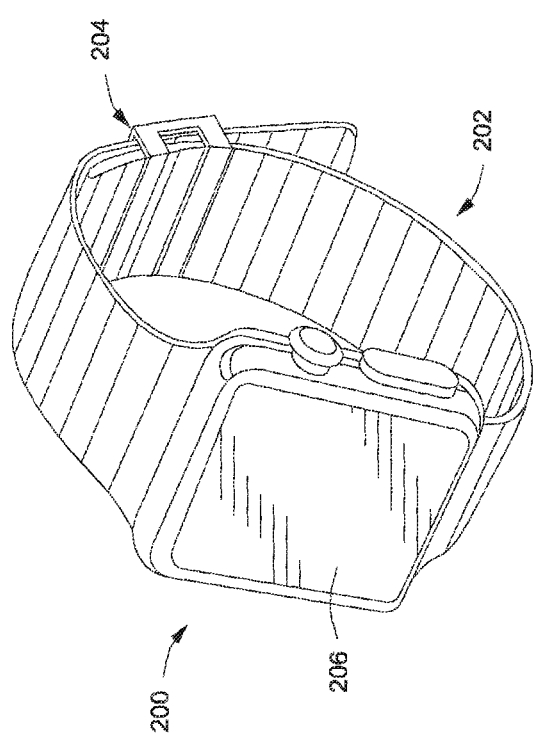
FIG. 2 is an illustration of an exemplary compact processing device that can implement an exemplary system and method in accordance with an embodiment of the present invention.

Referring to FIG. 2, an exemplary compact processing device 200 is shown with an attached adjustable strap 202 having a latching mechanism 204 for securing the compact processing device 200 to a bodily appendage, such as a human user wrist, arm or leg in a wearable configuration. The compact processing device 200 includes a compact touch display screen 206 enabled user interface to render display images and to receive tactile input information such as touch events, user generated movements and contacts. In various embodiments, the tactile input information can be entered, for example, using a human user digit, a special glove, a stylus, or the like, in accordance with touch display technologies known in the art.

Figure 3:
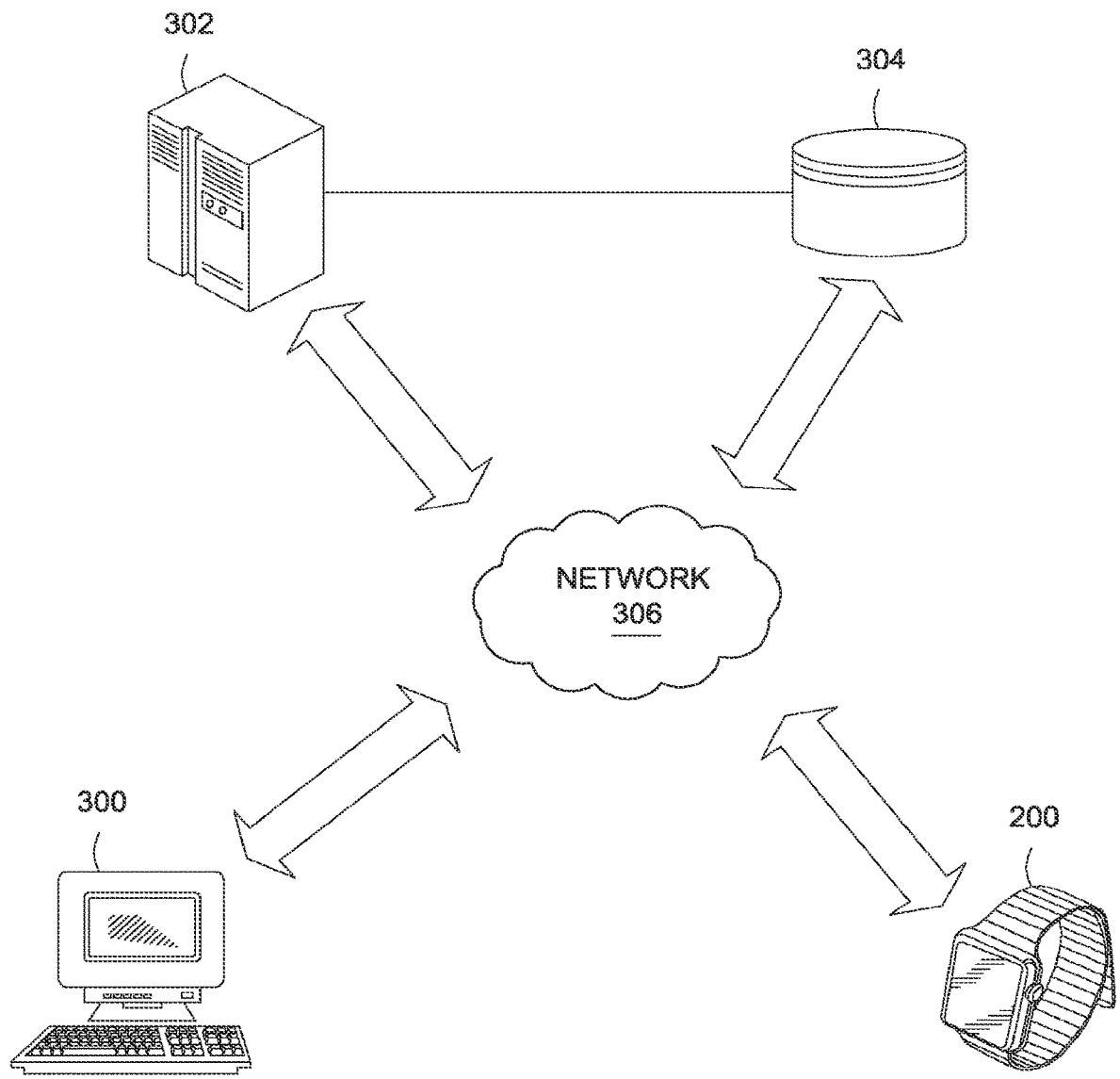
FIG. 3 is an illustration of an exemplary communications network that can be employed by an exemplary system and method in accordance with an embodiment of the present invention.

As shown in FIG. 3, the compact processing device 200 of FIG. 2 or a computing device 300 can be communicatively coupled to a communications network 306. For example, in some configurations, the compact processing device 200 communicates with a remote server 302 to access data, such as marketing information, product information, service information, and pricing information from a remote database 304, such as an online shopping website data center. The compact processing device 200 also communicates with the remote server 302 to access personalizing data such as overlay, content or experience sharing settings from a remote database, which can be the remote database 304 or a database independent from the database 304 but communicatively accessible by the compact processing device 200 through the remote server 302.

In various embodiments, the communication network 306 can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

Figure 4:
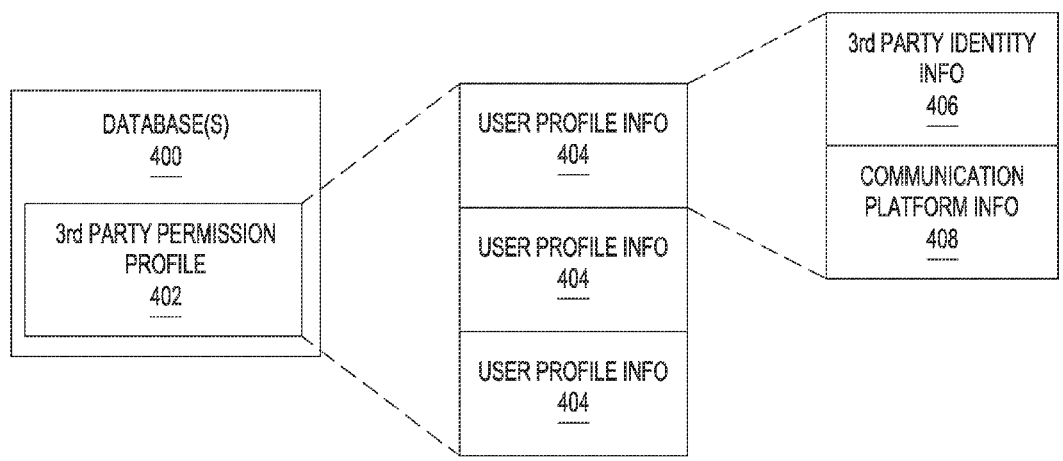
FIG. 4 is a block diagram illustrating an exemplary database in accordance with an embodiment of the present invention.

FIG. 4 illustrates a block diagram of an exemplary database 400 in accordance with an embodiment of the present invention. The database 400 can be a part of the database 304 of FIG. 3, an independent database servicing any application or components running on compact processing devices, including but not limited to ecommerce applications. In alternative embodiments, the database 400 can be implemented to reside in the same computing device as the applications or components it services.

Figure 6A:
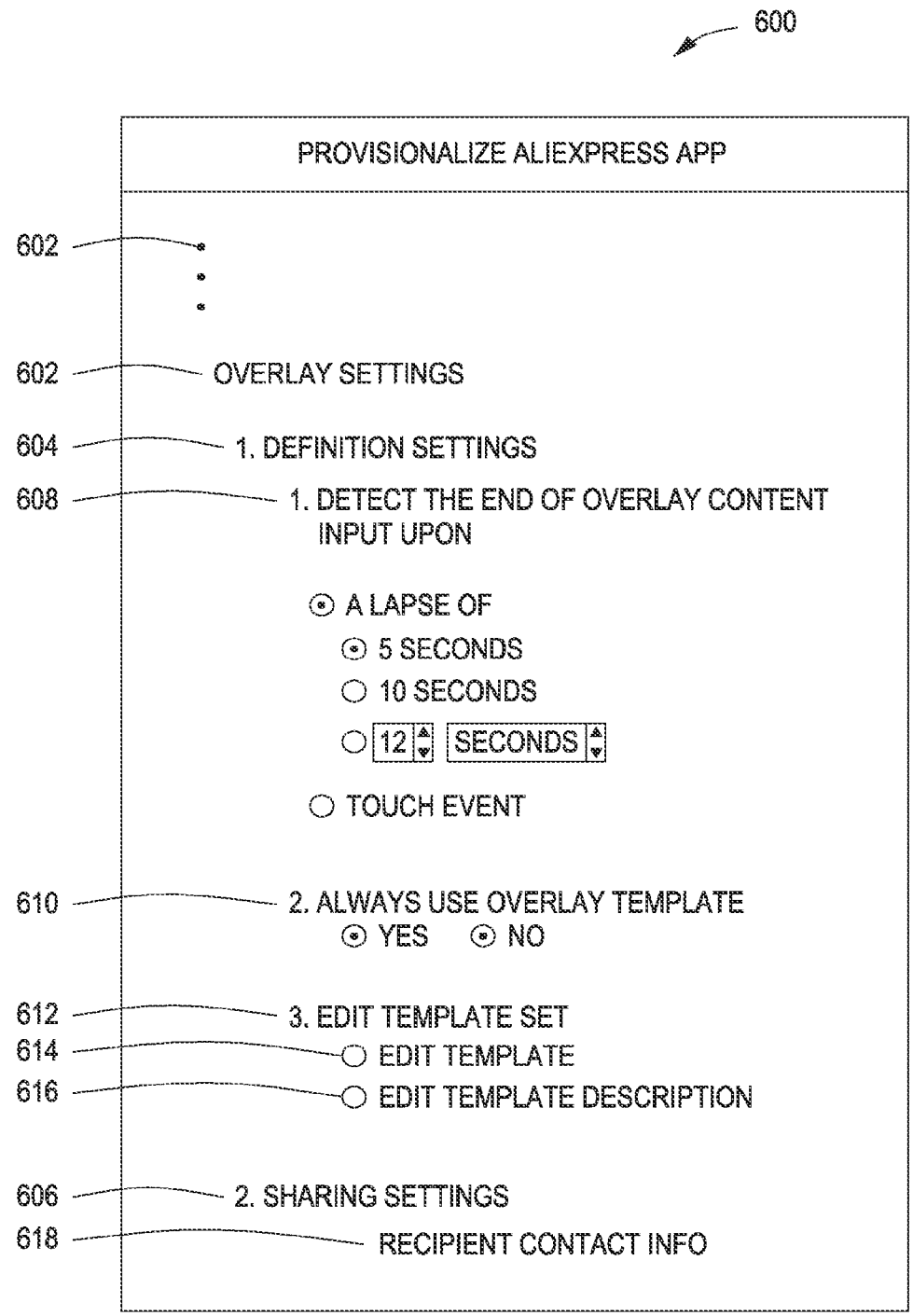

Database 400 is shown to include third party permission profile 402 that stores user profile information 404 for each third party, with whom the user of the ecommerce marketplace intends to share content encountered and impressions thereof while shopping on the ecommerce marketplace. The user profile information 404 may include third party identify information 406 that prescribes the identities of third parties. The user profile information 404 may also store communication platform information 408, which the prescribed third parties associate with. The user profile information 404 can be personalized by the user of the ecommerce marketplace through an application (part of the menu options of which is shown in FIG. 6A) that provides the user with a set of operations of adding, editing, or deleting user profile information 404.

Figure 5:
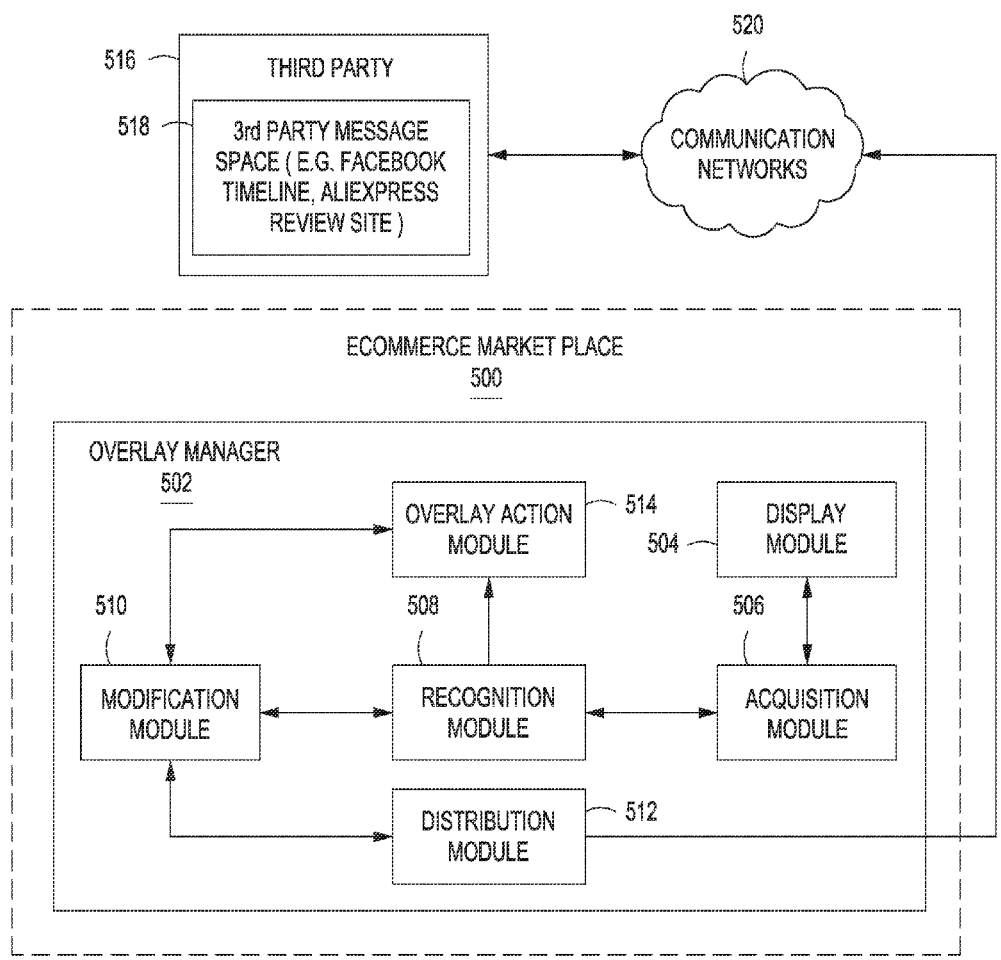
FIG. 5 is a block diagram illustrating an exemplary system for content interaction via user generated overlays on a mobile device in accordance with an embodiment of the present invention.

Now turning to FIG. 5, a block diagram illustrating an exemplary system for a user to interact with content presented on a mobile device such as the compact processing device 200 of FIG. 2. The mobile device allows the user to shop in an ecommerce marketplace 500 via an ecommerce application (not shown) running on the mobile device. An overlay manager 502, executed on the mobile device either as a part of the ecommerce application or an independent application running on the mobile device or a part of the operating system of the mobile device, allows for interacting with content presented on the mobile device via overlays generated by the user. In some embodiments, images from the presented content with overlays can be shared with friends, family, groups or communities to indicate the user's impression of the content presented. In other embodiments, overlays generated over the presented content can be converted into actions that the user commands the application or the mobile device to perform upon the presented content.

Exemplary types of user overlays that a user can generate and subsequently use to interact with content presented can include, but not limited to graphic shapes, lines, dots, textual information, numeric information and combinations thereof. User overlays can also be communicated in any language the user of a mobile device wishes to. In alternative embodiments, both the ecommerce application and the overlay manager 502 can be implemented as full blown applications running on a general computing device, in addition to applications or components customized for a compact processing device with a smaller footprint of processing power.

As illustrated in FIG. 5, the overlay manager 502 includes a display module 504, an acquisition module 506, a recognition module 508, a modification module 510, a distribution module 512, and an overlay action module 514. The display module 504 is configured to receive a content (not shown) on a mobile device. Such content can be any user interface elements, graphics, icons, images, text, numerals, symbols, web pages, video and the like, as well as combinations thereof. For example, the content can be an image of an item offered for purchase in the ecommerce application executing on the mobile device. Such an image can include an image of the item, with or without pertinent sales information such as pricing information or time-sensitive pricing information. For another example, the content can also be a composite of an image of an item offered for purchase by the ecommerce application, together with user interface elements of other applications or components executing on the mobile device.

Content received by the display module 504 can associate with a set of actions from which the user can select to task the application or the mobile device to perform in the context of the received content. In some embodiments, when the content received is a product image presented by user interface elements of the ecommerce mobile App, the context of the content is the ecommerce application. Given the context being the ecommerce application, the content received is accordingly responsive to actions available under the ecommerce application. For example, such actions can be "browse to the next product," "browse to the prior product," "switch to the next category of products," "switch to the prior category of products," "buy now," "add to wish list," "gift wrap," "share impression," and the like. In addition to initiating actions by touch events such as tapping on certain sensitized areas on the touch screen display, right-to-left linear swiping and left-to-right linear swiping, the user can also initiate actions by generating overlays over the content received. For example, a user drawing a box shape over a product image of the received content initiates an action of including a gift wrapping option upon the user proceeding to purchase the product.

In other embodiments, when the content received is a composite, e.g., a product image displayed at the center portion of a watch face of the time display of a compact processing device, the context is the ecommerce application integrated into the time displaying application rendering the watch face. As the context being applications with hybrid or merged interfaces, the composite content can accordingly be responsive to actions specifically customized to the shared interfaces of the applications. For example, such actions can be "select a category," "show details," "hide details" and "switch categories," and the like.

The acquisition module 506 is configured to capture an overlay (not shown) generated by the user upon the content received by the display module 504. The acquisition module 506 acquires the overlay through detecting touches or contacts generated by the user upon the content displayed on a touch screen of a compact processing device. Touches and contacts include, but not limited to sensed contact or movement on the surface of the touch screen display that correspond to taps, swipes, pinches, flicks, marks, lines, geometric shapes, gestures, or the like. In various embodiments, touches and contacts also include contact, movement and indications generated from input mechanisms for non-touch screen displays. For example, a user may use a stylus, a special glove, a laser beam, or the like, in accordance with display technologies known in the art.

The recognition module 508 matches the user generated overlay with a set of pre-defined overlay templates for the purposes of identifying a template intended by the user with the overlay. For example, if strokes resembling a shape of heart are received as an overlay, and the shape of heart is defined in the set of overlay templates, the recognition module 508 will recognize the shape of heart template as indicated by the user generated overlay by matching the two shapes. The context information can include but not limited to the user interface context, or any other signals the compact processing device can detect or communicate.

Alternatively, the recognition module 508 can also match the user generated overlay together with the received content to a set of templates to identify a template intended by the user. In this instance, each template of the set of the templates has an action associated therewith. In some embodiments, the recognition module 508 can utilize the context information provided by the received content together with the overlay to match to the set of overlay templates. In other embodiments, the recognition module 508 can utilize any information received content may provide with, together with the overlay to match to the set of overlay templates.

Upon a successful match of the overlay and received content to an overlay template of the set of the overlay templates, the recognition module 508 signals the overlay template identified to an overlay action module 514. The overlay action module 514 is configured to task the application or the mobile device to perform the action associated with the identified overlay template. In some embodiments, an overlay template with an action associated therewith is further specified to have an option of updating the content to reflect the action performed. With such an option, the overlay action module 514 will signal the modification module 510 to update the content according to the option defined for the action associated with the template. For example, the update option can be assigning the overlay template for modifying the content received. In other embodiments, an action can be performed without providing any visual updates to inform the user of the action performed.

Upon a successful match of the overlay to an overlay template without associated action, the recognition module 508 assigns the identified overlay template to the received content. Upon unsuccessful recognition of any match to the set of overlay templates with the overlay generated by the user, the acquisition module 508 discards the overlay generated by the user and is ready for recognizing a new overlay input by the user. In alternative embodiments, upon finding no match to the set of pre-defined overlay templates with the overlay generated by the user, the acquisition module 508 can nevertheless assign to the content the overlay as generated by the user. However, in either case, absent successful recognition of a matching template with the generated overlay, the acquisition module 508 does not signal the overlay action module 514.

The modification module 510 is configured to superimpose the assigned overlay template onto the underlying image on display to create a third image. The overlay template can be assigned to the received content either by the recognition module 508 or the overlay action module 514. Depending on the graphic format utilized and supported by the mobile platform, the modification module 510 can juxtapose the assigned overlay template in a variety of ways. In some instances where the graphic format supports image layers, the modification module 510 can superimpose the assigned template as the top layer onto the underlying image. In other instances where the graphic format does not support image layers, the modification module 510 can merge the template image with the underlying image. In either case, for example, an overlay template can be applied to the underlying image in the manner of being wholly solid, wholly opaque, partly opaque and partly translucent, or wholly translucent. Herein, the term "superimpose" and the term "merge" can be used interchangeably.

When the user generated overlay is assigned as a template to the underlying content, the modification module 510, in alternative embodiment, can superimpose the overlay in a wholly translucent manner while preserving the other aspects of the user generated overlay such as the exact shape and the exact position in relation to the underlying content. In this way, no portions of the underlying content will be obscured when the overlay is superimposed or merged with the underlying content. For example, a user-drawn shape of heart can be displayed on top of the underlying content allowing some portions of the underlying image to remain visible while obscuring other portions of the underlying content. The shape of heart may also be translucent so that the content portions obscured by the shape of heart may remains partially visible, providing unobstructed view of the underlying content.

In alternative embodiments, the third image may include information that allows an overlay template to be removed from the third image. With an overlay template removeably added to the underlying image, a user can further modify the underlying image by canceling the overlay template, or providing different overlay template, when the user forms a different impression of the underlying image upon viewing the image again at a later point of time.

The distribution module 512 is configured to transmit the third image over a communication network 520 to a third party 516. The distribution module 512 retrieves from a database 400 of FIG. 4 information regarding the data identifying the communication network and the user profile information identifying a recipient on the communication network, i.e., the third party 516, for whom the third image is intended.

FIG. 6A illustrates an exemplary menu options of a user interface of a personalize application 600 for a user of an ecommerce marketplace to share images with overlays on a mobile platform. As shown in FIG. 6A, the personalize application 600 includes multiple menu options 602 to personalize various features of an ecommerce application running either on a general computing device or on a compact processing device (e.g., AliExpress™ or AliExpress™ App).

One of the menu options 602 is an overlay settings option 602, which further includes two sub-options: definition settings option 604 and sharing settings option 606. The definition settings option 604 includes an option 608 to "detect the end of overlay content input upon", allowing the user to choose from pre-determined ways of detecting the end of the user inputting an overlay content. For example, with the lapse of time based mechanism, the user may select a pre-defined amount of time after which inactiveness from the user on the touch screen indicates the end of user generating an overlay content upon the touch screen. With this option, the user may select "5 seconds" or "10 seconds" or any user-preferred amount of time as the time-out setting for acquisition module 506. Alternatively, the user may also select a touch event based mechanism to detect the end of user generated overlay content. With this option, upon detecting any touch event which the ecommerce application is responsive to, the acquisition module 506 stops capturing overlay content form the user. For example, if a user swiping from left to right on the touch screen cues the ecommerce application to present the next commercial item in the same category, then such swiping indicates the end of the user conveying an impression on the image of the current commercial item on display. Nevertheless, the end of the user generated overlay content can be implemented in accordance with user interface technologies known in the art.

The definition settings option 604 also includes a choice of whether to "Always Use Overlay Template" 610, allowing the user to select a "YES" or "NO" setting. For example, when the user selects "YES" option and when an overlay content generated by the user is not recognized as matching any pre-defined overlay template, no overlay template will be superimposed onto the image upon which the user generates the overlay content. However, when the user selects the "NO" option, a user generated overlay content that is not recognized as matching with any of the pre-defined overlay template will nevertheless be superimposed upon the image to indicate the impression the user conveys with the overlay content.

The definition settings option 604 further includes a template editing option 612, allowing the user to add, edit or delete individual overlay template of a set of pre-determined overlay templates through an edit template option 614. The template editing option 612 also includes an edit template description option 616. The edit template description option 616 allows the user to review and edit a string of textual comments that are associated with each template of the set of overlay templates. For example, a description for a heart-shaped template can be "like it and wish to have it" while the description for a smiley face template can be "it is nice." For another example, the user may add or define new overlay template such as an acronym "SFGD" and provide the associated description as "Shop For Group Discount?". Without user's definition of a phrase like "SFGD" the recognition module 506 will recognize the overlay content of "SFGD" as not matching any of the pre-defined overlay template.

The sharing settings option 606 includes a set of recipient contact information 618. The recipient contact information 618 identifies third parties with whom the user intends to share content and experience while shopping on the ecommerce marketplace. With this option, the user can add, edit, or delete third party contact information. The recipient contact information 618 is stored in the third party permission profile 502 of FIG. 5 of the database 500 of FIG. 5 as user profile information 504 of FIG. 5. When the user adds, updates or deletes an entry of the recipient contact information 618, the corresponding user profile information 504 of the database 500 will be added, updated or deleted, accordingly.

Figure 6B:
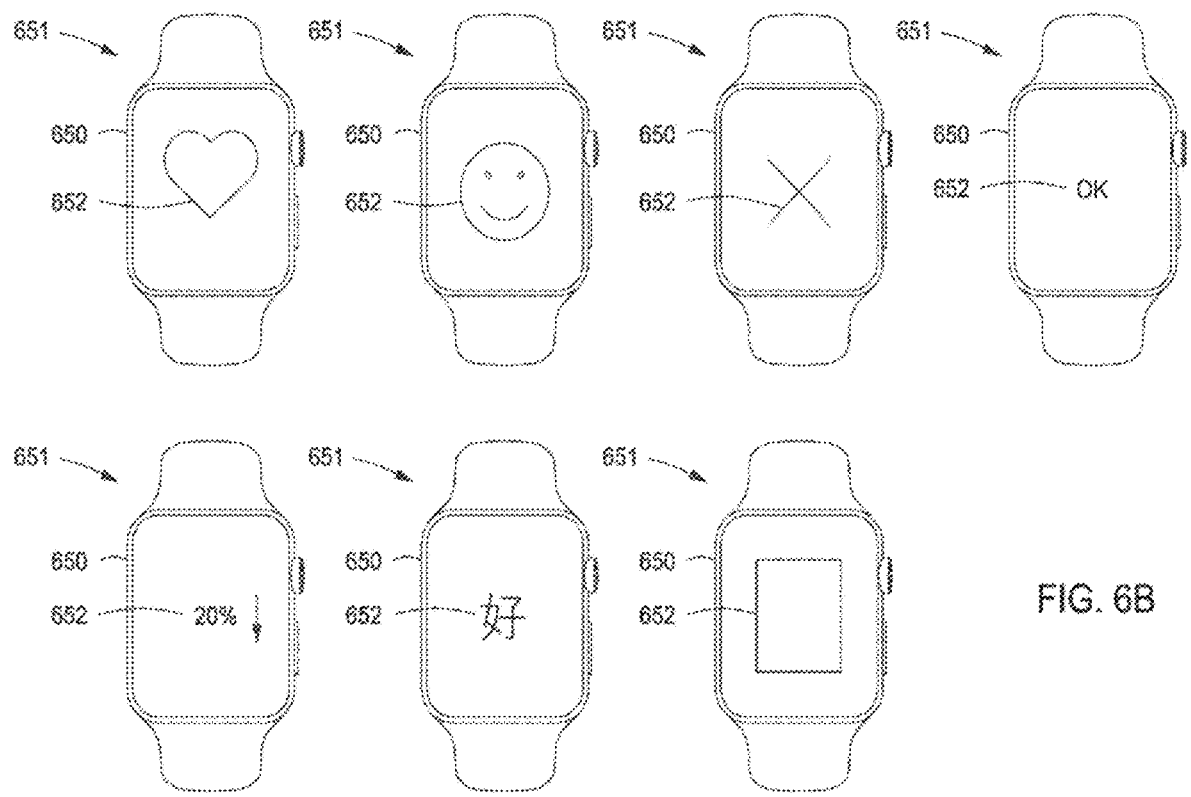

FIG. 6B illustrates a plurality of exemplary user generated overlay content that can be recognized by the recognition module 508 by matching the overlay input to a set of pre-defined overlay template to identify a template intended by the overlay input. For example, a user can draw on a touch screen 650 of a mobile platform 651 to generate any types of overlays 652, including but not limited to a shape of a heart, a smiley face, a check, a box, a two lettered word "OK", a combination of a string of textual information, numeric information and symbol information "20%↓" or a character with the meaning "good" in simplified Chinese.

Figure 6C:
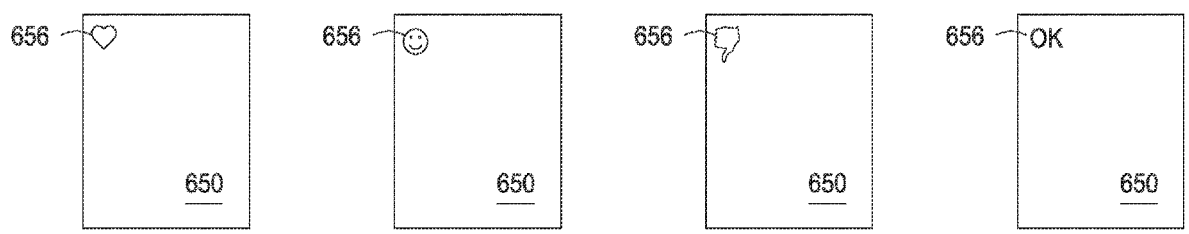
Figure 6C:
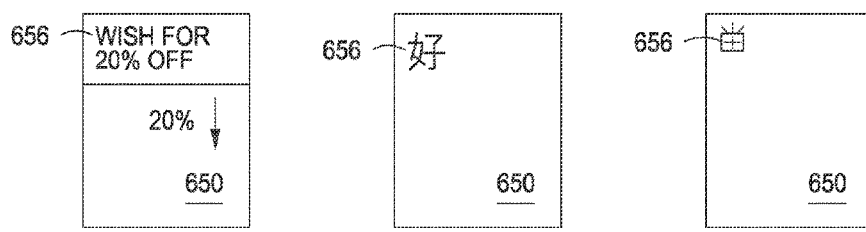

FIG. 6C illustrates a plurality of exemplary overlay templates that correspond to the user generated overlay content 652 of FIG. 6B. An overlay content 652 of FIG. 6B can be recognized by the recognition module 508 as matching with a pre-defined overlay template 656. For example, a user hand-drawn shape of a heart or a smiley face or a box can be recognized as that the user intends to draw a shape of heart or a shape of a smiley face or a gift box, respectively. Or, a user generated cross will be recognized as a thumb-down template, a hand-drawn "OK" word as text "OK", a hand-drawn "20%↓," as "wish for 20% off", a hand-drawn Chinese character as the character it represents. The overlay template 656 can be a scaled-down or standardized version of the corresponding overlay content 652. In some embodiments, the overlay template 656 can be superimposed at the upper left corner of the image displayed on the screen 650. In alternative embodiments, the modification module 510 can superimpose the overlay template 656 at any position on the image displayed on the screen 650.

FIG. 6D illustrates a plurality of exemplary mappings 680 amongst overlay templates, context, actions, and update options. A pair of an overlay template 656 and content can correspond to an associated action as well as an update option. Such an action is what the user is enabled to perform in response to the received content. In some embodiments, the content can be the context information the content provides. For example, in the context of an AliExpress App, a shape of heart template corresponds to an action to "add-to-wish-list" and an update option to assign the heart shaped template for modification to reflect the action. For another example, again in the context of an AliExpress App, a shape of box template corresponds to an action to "gift-wrap" upon the user's purchasing and an option of no update to reflect the action.

Further, in the context of an AliExpress integrated with a circular watch face of a time display application, a shape of an arc with an center angle of any degree and a start point 670 and an end point 672 corresponds to an action for switching displays from a category represented by an icon in the closet vicinity to the start point 670 to a category represented by an icon in the closet vicinity to the end point 672. When the end point 672 of the arch shaped overlay is generated by a clock-wise movement starting from the start point 670, the action corresponds to switching categories clock-wise. When the end point 672 of the arch shaped overlay is generated by a counter clock-wise movement starting from the start point 670, the action corresponds to switching categories counter clock-wise. As the correspondent actions will update the time display accordingly upon the switch of categories, no update option needs to be defined in the mappings 680.

Furthermore, back to the context of an AliExpress App, a similar shape of an arc with a center angle of any degree and a start point 670 and an end point 672 will not correspond to any action that can be performed in response to the content received in the AliExpress App. For another example, a smiley face template and a content received in the AliExpress App does not associate with any action. Recognized as a template without associated action, the smiley face template will nevertheless be assigned to the received content for the purposes of modifying the received content, etc.

Now turning to FIGS. 7A-7J, an exemplary sequence of display images rendered on touch display screen 703 of a compact device 700 is depicted, along with associated touch events, gestures and user input of overlay content. The initial display image of FIG. 7A includes a product display image 702, consisting of a product image 704, a price image 710 superimposed over a portion of the product image 704, a navigation header 716, a current time indicator 701 and a product category queue 708 with icons 712 representing various categories of products offered for purchase. For example, the icons 712 represent categories including household large appliances, small appliances, sporting goods, baby products, apparel, accessories, furniture, mobile phones and electronics. The currently selected icon 714 is highlighted, for example, shown in a different color than and raised above the level of the other icons, and encompassed by a colored circle, in order to cause the currently selected icon 714 to be distinguished from the other icons 712. For example, a jacket is shown on the user interface of a wrist-wearable device in FIG. 8A, with an advertised price of $20.21, with the apparel category icon highlighted, on the AliExpress™ shopping site at 10:09.

Figure 7A:
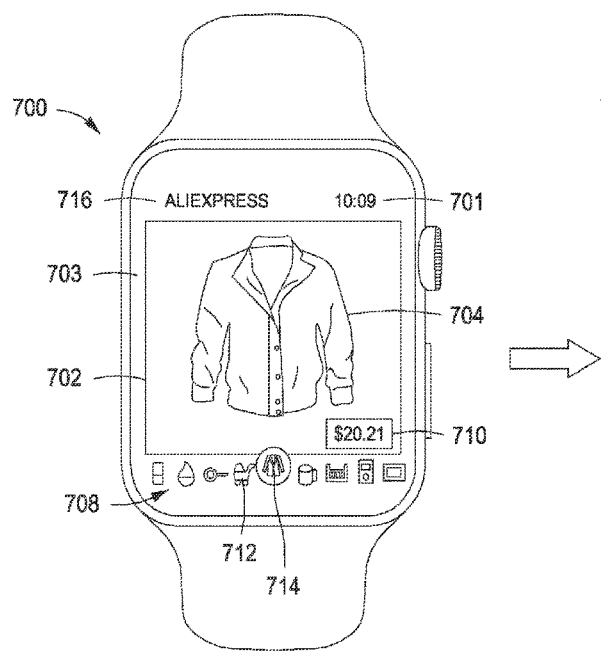
FIGS. 7A-7J depict a sequence of an exemplary method of interacting with content by sharing images with overlays, as well as converting user generated overlays into actions on a mobile device in accordance with an embodiment of the present invention.
Figure 7B:
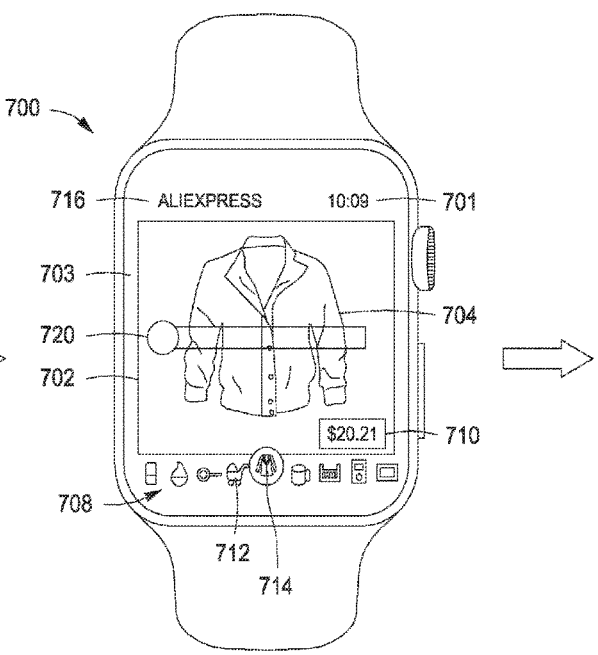

Referring to FIG. 7B, a touch event 720 is depicted, for example, as sensed in the left half of the product display image 702 and next to the product image 704. In this instance, the touch event 720 continues, as depicted herein, in a generally linear motion, or swipe gesture, from left-to-right on the surface of the touch display screen 703 and across the product image 704.

Figure 7C:
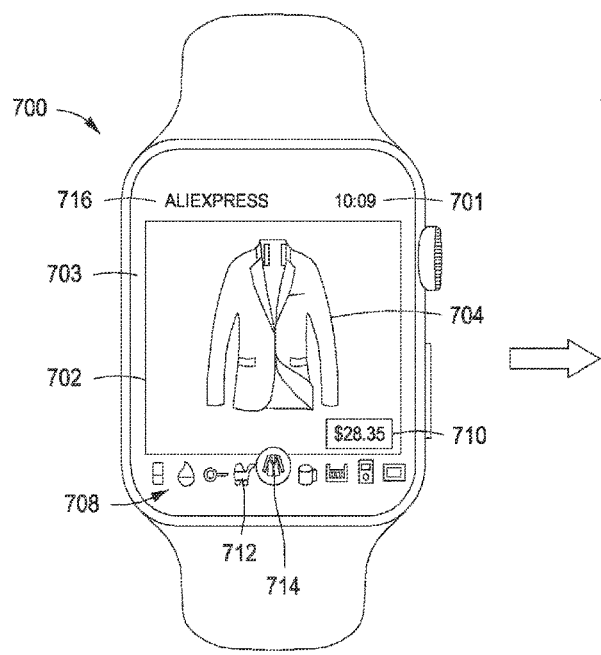

In response, as depicted in FIG. 7C, as the swipe passes from left-to-right across the product image 704 and terminates in the right half of the touch display screen 703, the product display image 702 is replaced by a product display image corresponding the text product in the same category queue. For example, a blazer is shown instead on the touch display screen 703, while the same selected product category remains highlighted in the product category queue 708.

Figure 7D:
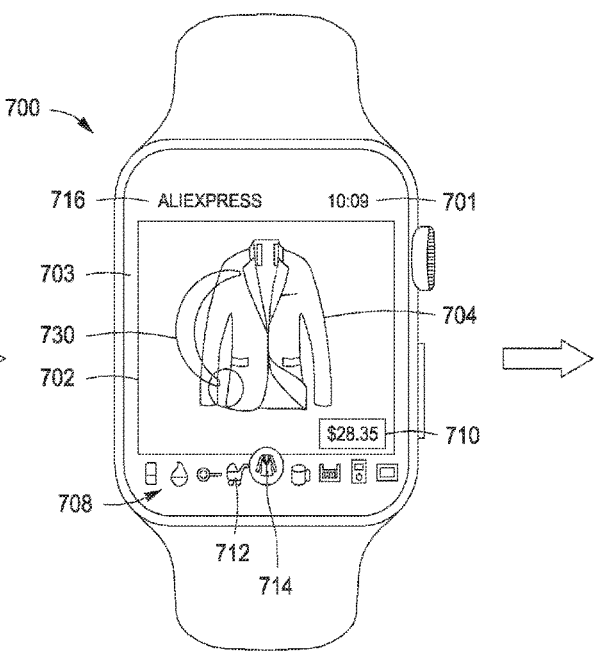

Upon viewing the newly displayed product image 702, the user forms an impression of the product, i.e., the blazer, and starts to share that impression with friends, family or a group by initiating a touch contact 730. Referring to FIG. 7D, the touch contact 730 is depicted, for example, as a swipe contact sensed in the central portion of the touch display screen 703 over the product image 704. As the instant touch contact 730 is not recognized as a touch event that triggers actions of the ecommerce application other than from the acquisition module 506, the acquisition module 506 starts to capture the touch contact 730 into a user generated overlay.

Figure 7E:
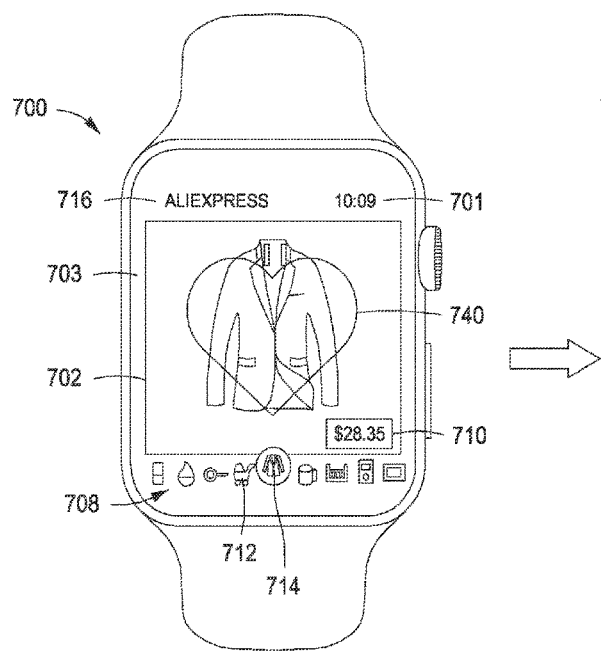

As the touch contact 730 continues in a heart-shaped drawing motion on the touch display screen 703 over the product image 704, the acquisition module 506 continues to capture the touch contact 730 into a user generated overlay content. When the touch contact 730 concludes upon the completion of drawing the heart shape, the user stops interacting with the touch screen 703 and the acquisition module 506 stops acquiring a user generated overlay content from the user, and captures a user generated overlay 740 in the form of a hand-drawn shape of heart, as depicted in FIG. 7E.

Figure 7F:
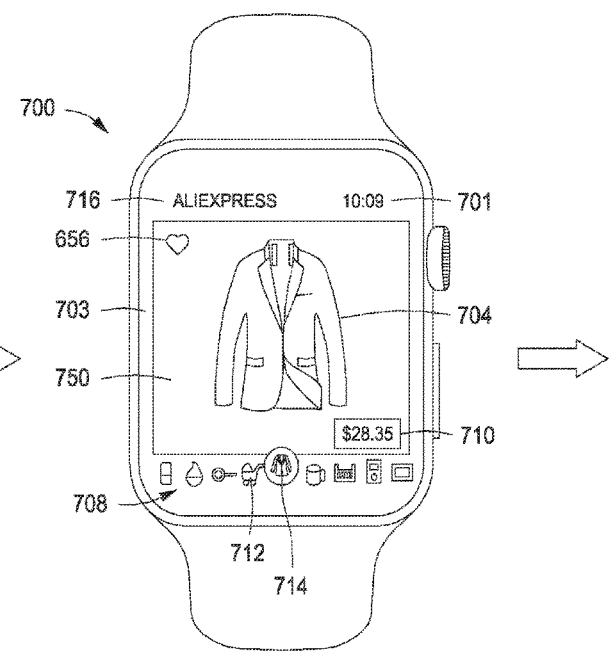

Upon capturing the user generated overlay 740, the recognition module 508 analyzes the overlay content 740 by matching the shape with the set of overlay templates personalized in the personalizing application 600. In response to a successful matching of the hand-drawn shape of heart to a heart-shaped template 656, the heart-shaped overlay template 656 is superimposed at the upper left corner of the product image 704 to generate a third image 750, as depicted in FIG. 7F.

Furthermore, the recognition module 508 can further analyzes the overlay 740 by matching the heart-shaped template and the received content to the set of templates associated with actions. Upon determining that an action of "add-to-wish-list" is associated with the heart-shaped template and the content received in the context of AliExpress App, the recognition module 508 signals the overlay action module 514 to task the AliExpress App to perform the action associated, i.e., to add the blazer to the wish list of the user of the AliExpress App.

Upon the generation of the third image 750, the distribution module 512, referring to the third party permission profile personalized by the overlay sharing setting option 606 to send the third image 750 to each party personalized in the overlay sharing settings. For example, the third image 750 can be saved into a file of formats in compliance with the Facebook® timeline postings and the file can be posted to the Facebook® timeline of the third party. For another example, the third image 750 can be saved into a file in HTML format and the file can be posted as a blog update to a blog on the Internet. In alternative embodiments, the overlay template description can also be included in the file generated from the third image 750. In other alternative embodiments, the file generated from the third image 750 can further include information such as star ratings, which correlate the number of stars with the impression conveyed by the template.

Figure 7G:
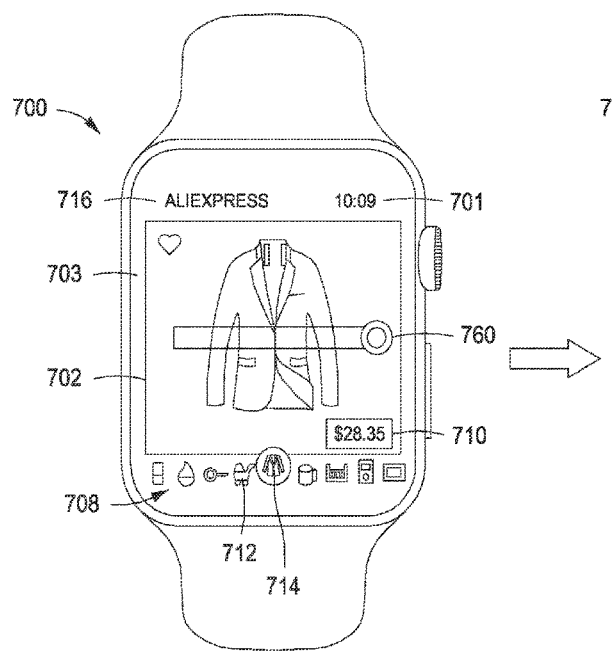

Now referring to FIG. 7G, a touch event 760 is depicted, for example, as sensed in the right half of the touch display screen 703 and next to the product image 704. In this instance, the touch event 760 continues, as depicted herein, in a generally linear motion, or swipe gesture, from rightto-left on the surface of the touch display screen 703 and across the product image 704.

Figure 7H:
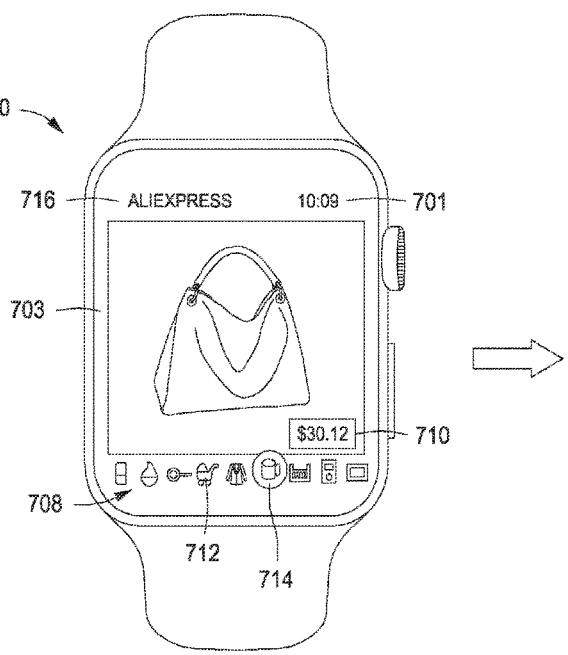

In response, as depicted in FIG. 7H, as the swipe passes from right-to-left across the touch display screen 703 and terminates in the left half of the touch display screen 703, the product display image 702 is replaced by a starting product display image corresponding to the successive category in the category queue, for example, a handbag from the accessory category. Accordingly, the prior apparel icon 714 is no longer highlighted in the form of being shown in a different color than or being raised above the level of the other icons, or encompassed by a colored circle. Instead, the next category icon for accessory is highlighted in the form of being shown in a different color than and being raised above the level of the other icons, and encompassed by a colored circle such that as a presently selected category the accessory icon is distinguished from the other icons in the category queue.

Figure 7I:
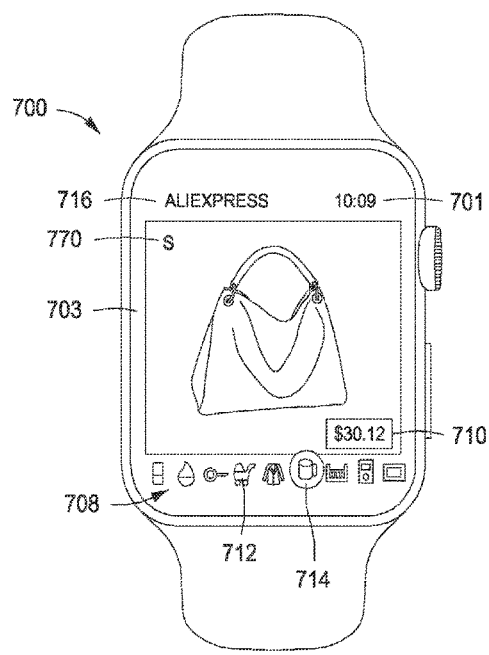

Upon viewing the product display image 702 displaying a product from a new product category, the user again forms an impression of the product, i.e., the handbag, and starts to share that impression with friends, family or a group by initiating a touch contact 770. Referring to FIG. 7I, the touch contact 770 is depicted, for example, as a swipe contact sensed in the central portion of the touch display screen 703 over the product image 704. As the instant touch contact 770 is not recognized as a touch event that triggers actions from the ecommerce application (such as browsing onto the next product offered for purchase, switching onto the next category of products offered for purchase, etc.), the acquisition module 506 starts to capture the touch contact 770 into a user generated overlay content.

Figure 7J:
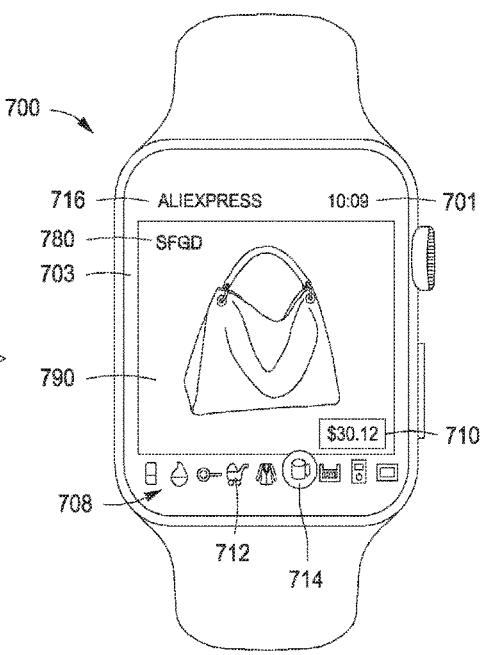

As depicted in FIG. 7J, the user draws in a discrete manner an overlay content as a textual string "SFGD" across the left top portion of the touch display screen 703. Upon capturing the hand-written letters as the user generated overlay content 780 by the acquisition module 506, the recognition module 508 analyzes the overlay content 780 by matching to the set of overlay templates personalized in the personalizing application 600. In response to an unsuccessful matching of the hand-drawn letters to any pre-defined overlay template, as well as a personalized overlay definition setting option as not to "Always Use Overlay Template," the modification module 510 nevertheless superimpose the overlay content 780 as it is generated by the user onto the product image 704 to generate a third image 790, as depicted in FIG. 7J. The distribution module 512 subsequently sends the third image 790 to third parties defined in the third party permission profile.

Now turning to FIGS. 8A-8E, an exemplary sequence of display images rendered on a touch screen 802 of a compact device 800 is depicted, along with user generated overlays and actions associated therewith. The initial display image of FIG. 8A includes a watch face 803, consisting of a watch dial 808 with numerals 812 corresponding to each hour and index markings 814 corresponding to each minute, hour arm 816 and minute arm 818 time indicators, as well as an incremental circular second indicator 810. The watch face 803 further includes a virtual bezel having symbols or icons 822, representing offer or item categories corresponding to each hour, a digital current time indicator 804, and a digital end-of-sale indicator 806. The remainder of the display image is fully opaque, providing a high-contrast black backdrop to the virtual components of the watch face 803.

Figure 8A:
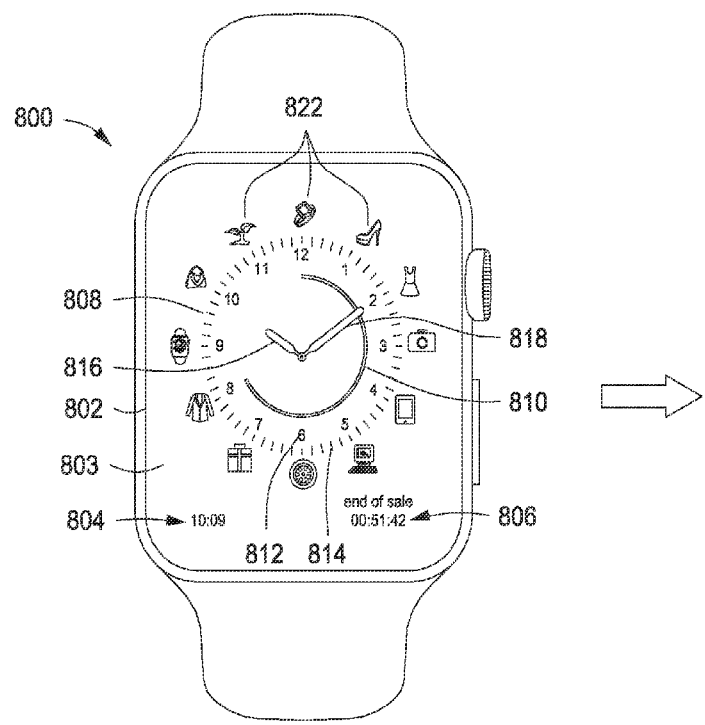

Referring to FIG. 8B, a touch 830 is depicted, for example, as sensed approximately over the symbol 822 corresponding to the ten o'clock hour. The symbol 822 corresponding to the ten o'clock hour is shown in the form of a handbag icon, presenting a category of handbags accordingly. In response to the touch 830, an image 834 of an item from the handbag category is displayed at the center portion of the watch face 803, obscuring the hour arm 816, minute arm 818, as well as the circular second indicator 810 shown in FIG. 8A.

Next, as depicted in FIG. 8C, the touch 830 continues in a clockwise arc motion, or swipe gesture, on the surface of the touch display screen 802 generally following the shape of the virtual bezel past the symbol 822 corresponding to the eleven o'clock hour. The symbol 822 corresponding to the eleven o'clock hour is shown in the form of a sapling icon, presenting a category of household items accordingly. As the swipe 830 passes away from the ten o'clock icon and into the half of the region of the bezel in the vicinity of the eleven o'clock icon of the bezel, the display of the center portion of the watch face 803 is changed to an image 834 of a product corresponding to the eleven o'clock hour, for example, a household item such as a couch pillow, as depicted in FIG. 8C.

Figure 8D:
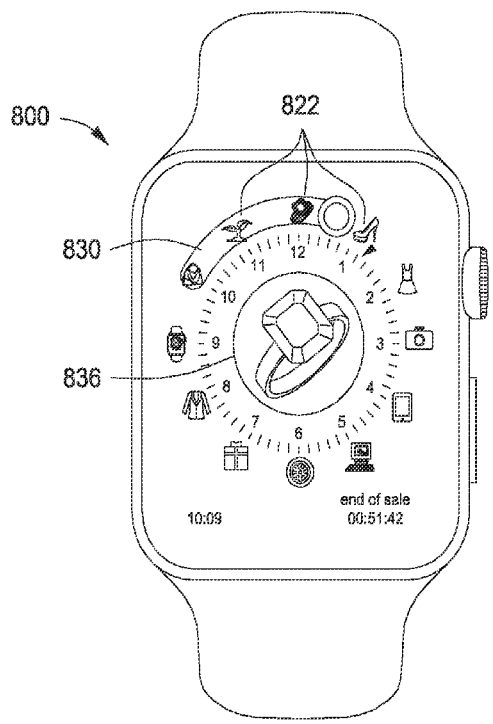

As depicted in FIG. 8D, the touch 830 further continues in a clockwise arc motion, or swipe gesture, on the surface of the touch display 802 over the bezel. Again, the touch 830 passes away from the eleven o'clock icon and into the half of the region of the bezel in the vicinity of, and then past the symbol 822 corresponding to the twelve o'clock hour. The symbol 822 corresponding to the eleven o'clock hour is shown in the form of a ring icon, presenting a category of jewelry accordingly. Once again, as the swipe 830 passes from the eleven o'clock region of the bezel to the twelve o'clock region, the center portion of the watch face 803 is again changed, as depicted in FIG. 8D, to display an image 836 of a product corresponding to the twelve o'clock hour, for example, a jewelry item such as a diamond ring.

Figure 8E:
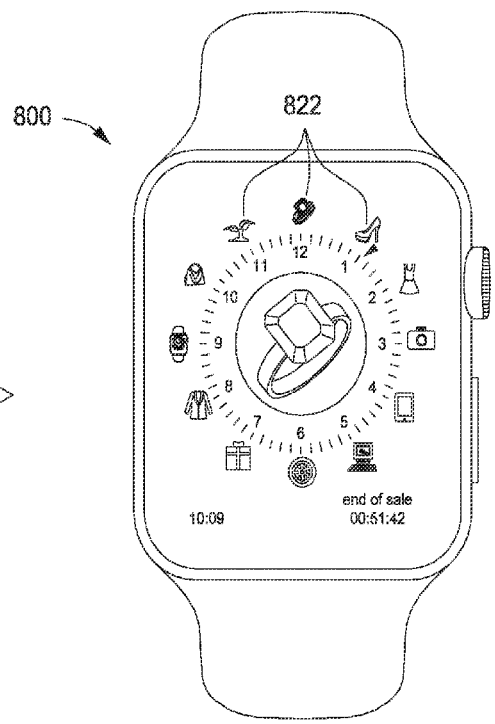

As further depicted in FIG. 8D, the touch 830 terminates over the bezel just to the right of the symbol 822 corresponding to the twelve o'clock hour. In response, the product offer highlight display image 836 displayed at the center portion of the watch face 803 corresponding to the last symbol passed over, that is, the ring icon corresponding to the twelve o'clock hour, remains on the display screen after the swipe terminates, as depicted in FIG. 8E. As illustrated in FIG. 8E, the corresponding ring icon 822 on the bezel is highlighted, indicating the category corresponding to the product offer displayed in the center portion of the watch face 803.

User generated arc-shaped overlays through circular contact on the touch display screen only illustrates exemplary overlays that can have actions associated therewith for content received in the exemplary time display context. As the dial of the watch face may take on any shapes (e.g., a shamrock), bear a variety of a full or limited or none of hour markings or minute markings, overlays that generally tracks the particular shapes of the dial of a watch face can initiate actions similar to an arc-shaped overlay over a circular dial of a watch face.

Figure 9:
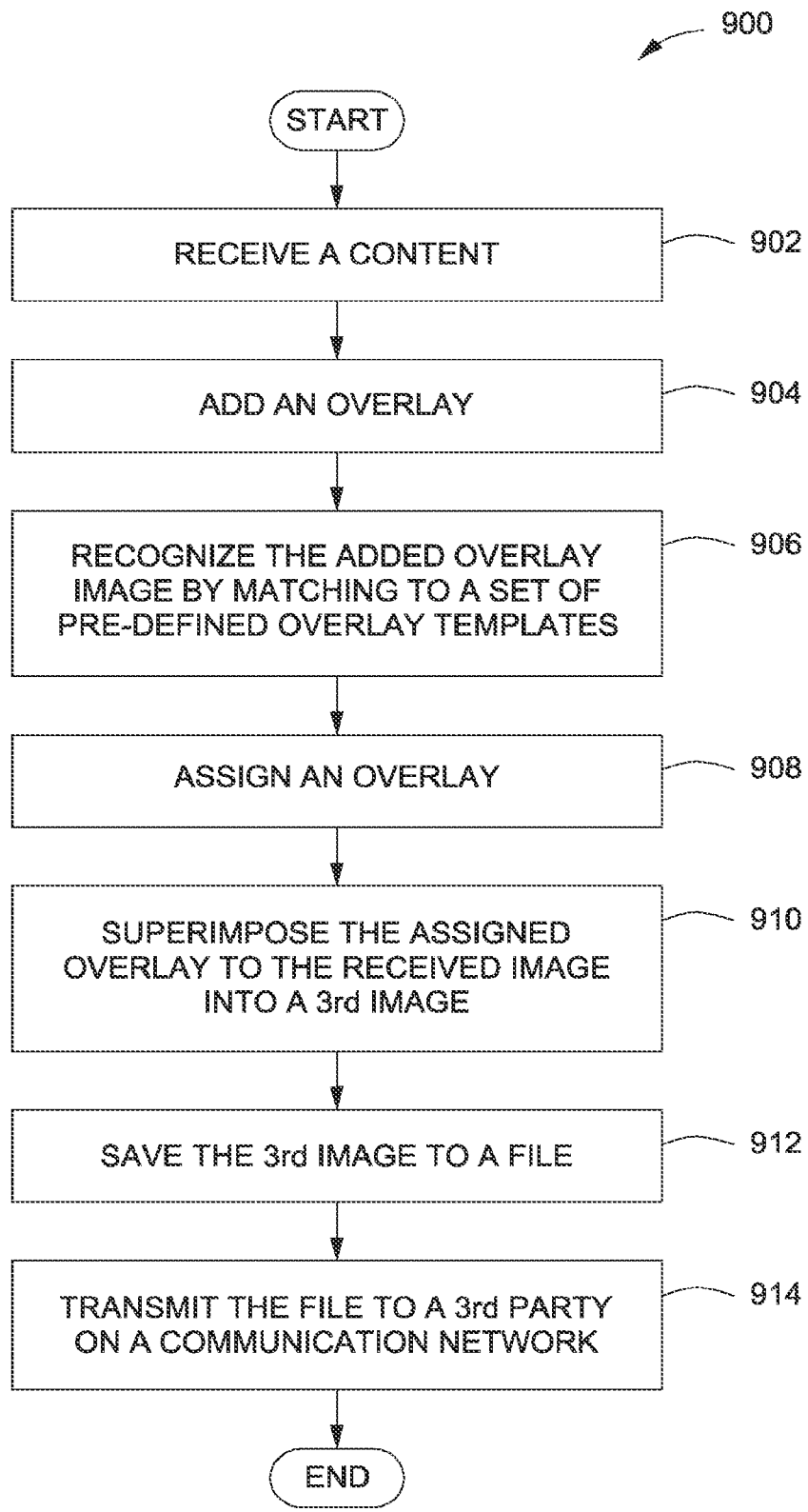
FIG. 9 is a flow chart representing an exemplary method of sharing images with overlays on a mobile device in accordance with an embodiment of the present invention.

FIG. 9 illustrates an exemplary method 900 for a user of an ecommerce marketplace to share images with overlays on a mobile platform in accordance with the present invention. The exemplary method 900 is provided by way of example, as there are a variety of ways to carry out the method. In one or more embodiments, the method 900 is performed by the processing device 200 of FIG. 2. Each block shown in FIG. 9 represents one or more processes, methods or subroutines carried out in exemplary method 900. The exemplary method 900 can begin at block 902. Although described in reference to a user shopping in an ecommerce marketplace on a mobile device with a touch display screen, the method described in FIG. 9 can be applied to any application that can be executed on a mobile device.

In block 902, content with an image, shown on a touch display screen of the mobile platform upon the user's encountering of an item offered for purchase, is received by the overlay manager 502 of FIG. 5. Upon viewing the image shown, the user forms an impression of the item displayed in the image. Subsequently, in block 904, the user conveys that impression by adding an overlay on the touch screen that displays the image.

When the conclusion of the user adding overlay content is detected, in block 906, the user generated overlay is recognized by matching to a set of pre-defined overlay templates to identify an overlay template intended by the user generated overlay in bock 904. Upon a successful match, an overlay template is assigned to the image in block 908. Alternatively, when the user generated overlay content does not match any of the overlay template pre-defined in the set of overlay templates, and when the personalized overlay definition settings permits adding an overlay as it is generated by the user, an overlay template will be assigned to the image in the form of the overlay as the user generates in block 908.

In block 910, the assigned template, either in the form of a pre-defined overlay template or in the form of the overlay as generated by the user in block 904, is superimposed onto the image displaying the item offered for purchase. A third image is created to include both the image displaying the item offered for purchase and the assigned template as well in block 910. The third image is saved in a file in block 912 and transmitted to a third party on a communication network such that, upon receiving and viewing the third image created in block 912, the third party comprehends the impression conveyed by the overlay template generated in block 904 towards the item displayed in the image.

Figure 10:
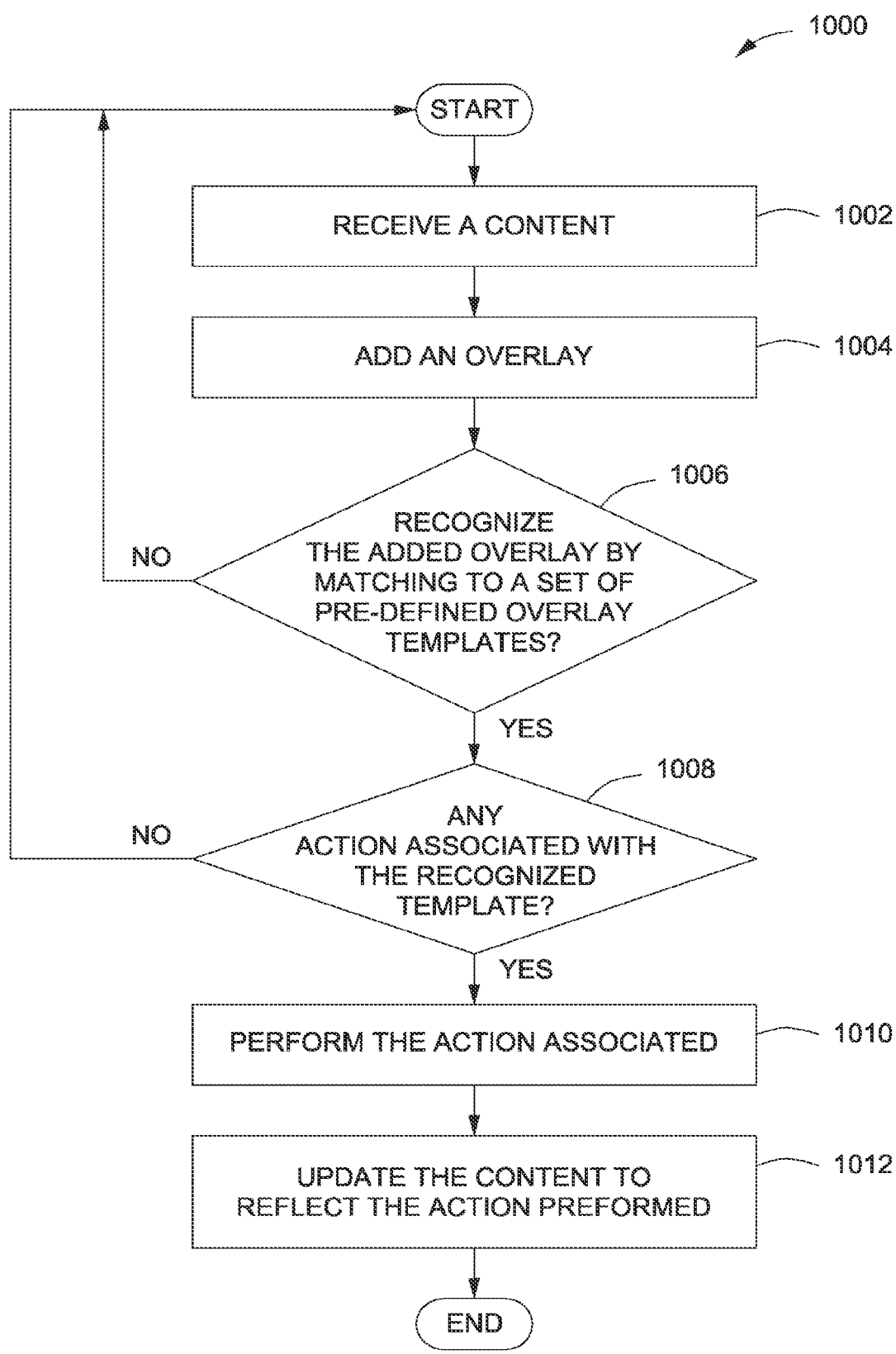
FIG. 10 is a flow chart representing an exemplary method of converting an overlay into an action on a mobile device in accordance with an embodiment of the present invention.

Now turning to FIG. 10, a flow chart of an exemplary method for converting a user generated overlay to an action on a mobile device in accordance with an embodiment of the present invention is illustrated. The exemplary method 1000 is provided by way of example, as there are a variety of ways to carry out the method. In one or more embodiments, the method 1000 is performed by the processing device 200 of FIG. 2. Each block shown in FIG. 10 represents one or more processes, methods or subroutines carried out in exemplary method 1000. The exemplary method 1000 can begin at block 1002. Although described in reference to a user shopping in an ecommerce marketplace on a mobile device with a touch display screen, the method described in FIG. 10 can be applied to any application that can be executed on a mobile device.

In block 1002, content shown on a touch display screen of the mobile platform is received by the overlay manager 502 of FIG. 5. Upon viewing the content shown, the user wishes to initiate an action in the context of the content. In block 1004, the user indicates that action by adding an overlay on the touch screen that displays the content.

Next, at decision block 1006, the overlay is matched to a set of overlay template to decide whether the overlay is recognized by the system. The decision block 1006 takes the Yes path to the decision block 1008 if there is a successful match of the overlay image to a pre-defined template of the set of the templates. Otherwise, the decision block 1006 takes the No path to the start of the method 1000.

At decision block 1008, with an identified template, a decision is made regarding whether an action is associated with the identified template under the context relating to the content received in block 1002. The decision block 1008 takes the Yes path to block 1010 if an action is identified. Otherwise, the decision block 1008 takes the No path to the start of the method 1000. In block 1010, the action associated with the identified overlay template is performed on the mobile device. In block 1012, the content received in block 1002 is updated, if specified by the options related to the associated action, to reflect the action performed on the received content.

Aspects of this disclosure are described herein with reference to flowchart illustrations or block diagrams, in which each block or any combination of blocks can be implemented by computer program instructions. The instructions may be provided to a processor of a general purpose computer, special purpose computer, mobile programming device, or other programmable data processing apparatus to effectuate a machine or article of manufacture, and when executed by the processor the instructions create means for implementing the functions, acts or events specified in each block or combination of blocks in the diagrams.

In this regard, each block in the flowchart or block diagrams may correspond to a module, segment, or portion of code that including one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, may be embodied in hardware, in software (including firmware, resident software, micro-code, etc.), or in any combination of software and hardware, including computer program products embodied in a computer-readable medium having computer-readable program code embodied thereon. In the context of this disclosure, a computer readable storage medium may include any tangible medium that is capable of containing or storing program instructions for use by or in connection with a data processing system, apparatus, or device.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. A method for sharing an image with one or more overlays on a mobile platform, the method comprising:
   receiving an image;
   adding an overlay to the received image, wherein the overlay is a generated content conveying an impression when viewing the received image;
   recognizing by matching the overlay to a set of templates for identifying a template intended by the overlay;
   assigning the template which is recognized with the overlay to the received image;
   superimposing the template onto the received image to create a new image, wherein the new image indicates the conveyed impression; and saving the new image into a file, wherein the file includes information regarding a review directed to content displayed in the received image and correlated to the conveyed impression.

2. The method of claim 1, further comprising transmitting the new image to a third party through a communication network, wherein the third party is a singular entity or a plurality of entities, and wherein the communication network comprises a social network.

3. The method of claim 1, wherein the assigned template is the added overlay when the overlay is not recognized as matching to the set of templates.

4. The method of claim 1, wherein the added overlay comprises textual information, numerical information, and/or a combination thereof, the textual information being communicated in any language.

5. The method of claim 1, wherein the assigned template is deletable.

6. The method of claim 1, further comprising:
detecting a touch event; and
displaying another image in response to detecting the touch event,
wherein the touch event comprises taps, swipes, pinches, or flicks.

7. The method of claim 1, wherein the received image identifies at least one item for purchase on the mobile platform.

8. The method of claim 1, wherein the received image further comprises a display context having a temporal context, and wherein the display context further comprises a display image of a watch dial, and symbols corresponding to hours on the watch dial, each symbol representing a category of at least one offer of an item for purchase.

9. A non-transitory computer readable storage medium having embedded therein program instructions, when executed by one or more processors of a computer, causes the computer to execute a process for sharing an image with one or more overlays on a mobile platform, the process comprising:
receiving an image;
adding an overlay image to the received image, wherein the overlay is a generated content conveying an impression when viewing the received image;
recognizing by matching the overlay to a set of templates for identifying a template intended by the overlay;
assigning the template which is recognized with the overlay to the received image;
superimposing the template onto the received image to create a new image, wherein the new image indicates the conveyed impression; and
saving the new image into a file, wherein the file includes information regarding a review directed to content displayed in the received image and correlated to the conveyed impression.

10. The non-transitory computer readable storage medium of claim 9, wherein the process further comprises transmitting the new image to a third party through a communication network, wherein the third party is a singular entity or a plurality of entities, and wherein the communication network comprises a social network.

11. The non-transitory computer readable storage medium of claim 9, wherein the assigned template is the added overlay when the overlay is not recognized as matching to the set of templates.

12. The non-transitory computer readable storage medium of claim 9, wherein the added overlay comprises textual information, numerical information, and/or a combination thereof, the textual information being communicated in any language.

13. The non-transitory computer readable storage medium of claim 9, wherein the assigned template is deletable.

14. The non-transitory computer readable storage medium of claim 9, wherein the process further comprises:
detecting a touch event; and
displaying another image in response to detecting the touch event,
wherein the touch event includes taps, swipes, pinches, or flicks.

15. The non-transitory computer readable storage medium of claim 9, wherein the received image identifies at least one item for purchase on the mobile platform.

16. The non-transitory computer readable storage medium of claim 9, wherein the received image further comprises a display context having a temporal context, and wherein the display context further comprises a display image of a watch dial, and symbols corresponding to hours on the watch dial, each symbol representing a category of at least one offer of an item for purchase.

17. A system for sharing an image with one or more overlays on a mobile platform, the system comprising:
an input interface configured to receive an image;
a processor coupled to the input interface configured to:
add an overlay to the received image, wherein the overlay is a generated content conveying an impression when viewing the received image;
recognize by matching the overlay to a set of templates for identifying a template intended by the overlay;
assign the template which is recognized with the overlay to the received image;
superimpose the template onto the received image to create a new image, wherein the new image indicates the conveyed impression; and
saving the new image into a file, wherein the file includes information regarding a review directed to content displayed in the received image and correlated to the conveyed impression.

18. The system of claim 17, wherein the processor is further configured to transmit the new image to a third party through a communication network, wherein the third party is a singular entity or a plurality of entities, and wherein the assigned template is the added overlay when the overlay is not recognized as matching to the set of templates.

19. The system of claim 17, wherein the added overlay comprises textual information, numerical information, and/or a combination thereof, the textual information being communicated in any language.

20. The system of claim 17, wherein the received image further comprises a display context having a temporal context, and wherein the display context further comprises a display image of a watch dial, and symbols corresponding to hours on the watch dial, each symbol representing a category of at least one offer of an item for purchase.

* * * * *